June 7, 1927.
E. SINNER
TIMER
Filed Oct. 23, 1922
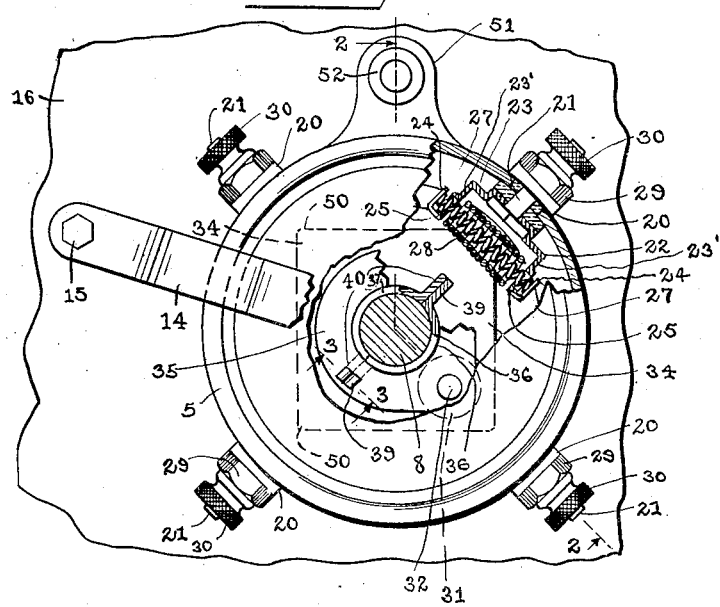
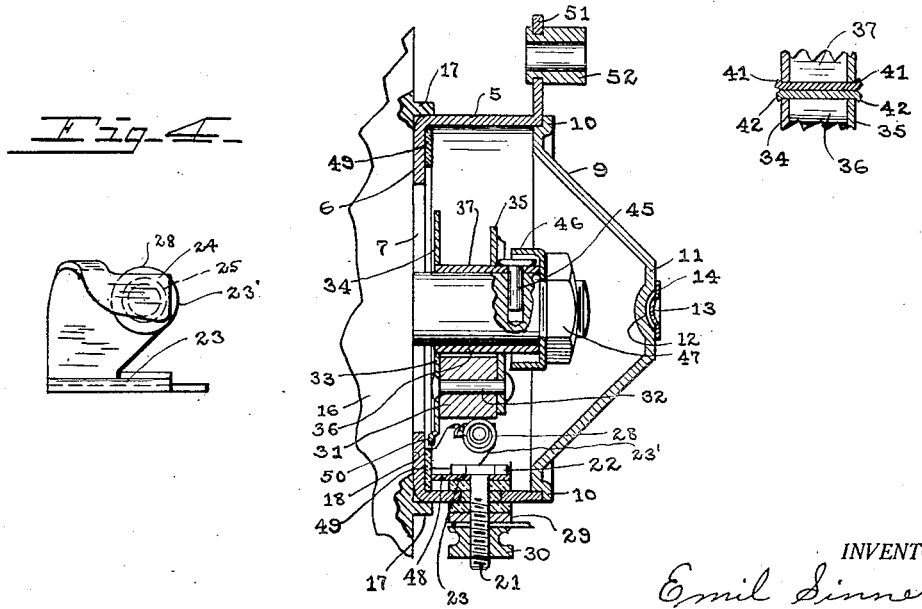
INVENTOR.
Emil Sinner
BY
Morsell + Keeney
ATTORNEYS.

Patented June 7, 1927.

1,631,291

UNITED STATES PATENT OFFICE.

EMIL SINNER, OF MILWAUKEE, WISCONSIN.

TIMER.

Application filed October 23, 1922. Serial No. 596,465.

This invention relates to circuit makers and breakers for automobile ignition systems, and more especially to a timer particularly, although not solely, adapted for use with the Ford car, and has for its principal object to provide a timer in which the parts are rendered readily accessible for inspection and repair.

A further object of the invention is to provide a timer having a relatively small number of moving parts which are so constructed and arranged as to greatly lengthen the life of the same.

A still further object of the invention is to provide a timer mechanism which will be simple in construction, comparatively inexpensive to manufacture, and more efficient in use than those which have been heretofore proposed.

With these and other objects in view which will appear as the description proceeds, the invention consists in the novel details of construction and combinations of parts more fully hereinafter disclosed and particularly pointed out in the appended claims.

In the accompanying drawings in which like numerals designate like parts in all the views;

Figure 1 is a front elevational view of a timer made in accordance with the present invention, certain of the parts being broken away for the sake of clearness;

Fig. 2 is a vertical sectional view taken approximately on the plane indicated by the line 2—2 of Fig. 1, looking in the direction of the arrows;

Fig. 3 is a detail sectional view taken on the plane indicated by the line 3—3 of Fig. 1; and, Fig. 4 is a fragmentary detail elevational view of one end of one of the stationary contact holding members, showing the manner of retaining the end of the spring contact member in its holder.

Referring to the drawings the numeral 5 indicates a casing provided with a back wall 6 having the axial opening 7 through which the timer shaft 8 passes. The front of the casing 5 is open, as is best shown in Fig. 2, and is adapted to be closed by means of a frustro-conical cover member 9, which is provided with a flange 10, forming a shoulder which is adapted to fit within the interior of the casing 5 to accurately seat or position the said cover member 9.

The flat outer face 11 of the cover member is preferably provided with a depression 12, which is adapted to be engaged by a raised portion 13 of the flat spring member 14, which member is pivoted as at 15, to the engine casing or other suitable support 16, upon which the timer is mounted. The said casing or support is provided with an annular rib 17, the interior diameter of which is equal to the exterior diameter of the casing 5, thereby forming a pocket 18 in which the timer casing is adapted to seat.

The said casing is provided with a plurality of relatively stationary contact members 20 equidistantly spaced around the circumference of the casing in the well known manner, which members comprise the bolts or studs 21, passing through the side walls of the casing 5, and insulated therefrom in the usual manner. The said bolts or studs 21 are provided with heads 22 which are adapted to engage the contact holding members 23 to position and hold the same in their proper places within the casing. The said holding members 23 may be stamped of suitable sheet material and preferably take the form substantially as shown.

The opposing legs 23' of the said members are provided with the openings 25, as is best shown in Figs. 1 and 4, and the outer end guard portions 24 of the members 23 are in line with said openings to provide seats or stops for the end portions 27 of the longer timer portion contact members 28.

These said contact members preferably comprise a pair of helical springs formed of suitable spring wire material and superposed one upon the other in co-axial relation, thus forming a yielding contact member, the outer resilient member of which is adapted to rotate upon its axis to constantly present changing contact surfaces to the movable contact member, thereby greatly prolonging the life of the stationary member. The said outer resilient member plays freely between the legs 23' while the ends 27 of the inner and longer resilient member extend through the openings 25 and bear against the guard portions 24 and are thereby yieldingly maintained in position.

The stationary contact members are retained in position by means of the lock nuts 29 which engage the threads of the studs 21, and suitable thumb nuts 30 are superposed upon the said nuts 29 for the purpose of securing the electrical conductors to the contact members in the well known manner.

The movable contact member of the timer comprises a roller 31 rotatably mounted upon a pin or shaft 32, carried by a supporting member 33. The said supporting member 33, as here shown, comprises a pair of plates or discs 34 and 35, which are held in spaced relation by means of the semi-cylindrical sleeve members 36 and 37, which surround the shaft 8 and which are provided with the ears or extensions 39 and 40, respectively, which extend through suitable apertures in the spaced plates 34 and 35, and have their end 41 and 42 slightly spread apart, as is clearly illustrated in Fig. 3. The supporting member 33 and its roller 31 are positioned and keyed to the shaft by the usual pin 45, and the parts are prevented from working off by means of the cupped washer 46 and lock nut 47, as will be clear from Fig. 2.

The stationary contact holding members 23 are prevented from turning axially about their studs 21 by means of an extension 48, formed integrally with the base portion of the said members 23, which extension engages a ring 49 of insulating material, positioned within the timer casing 5 adjacent its rear wall 6, as is clearly shown in Fig. 2.

The plate member 34 is preferably substantially square and its corners are depressed slightly as indicated at 50, see Fig. 2, to cause them to engage the inner surface of the rear wall 6 of the casing 5. Since the said plate 34 is rigid with the shaft 8, the engagement of the said corners 50 with the rear wall 6 will prevent the timer casing from leaving its seat within the socket 18 provided by the annular rib 17, when the spring member 14 is swung about its pivot 15 for the removal of the cover 9 to permit inspection or repair of the interior of the timer.

The casing 5 may be provided with an integral ear 51 provided with a pivot bushing 52 which is adapted to be connected to the rod or link, not shown, leading from the spark control lever upon the steering column of the machine whereby the said casing, together with its relatively stationary contact members, may be oscillated to advance or retard the spark, in the well known manner.

The timer operates in the usual manner, the rotation of the timer shaft 8 carrying with it the movable roller contact member 31 and causing it to successively engage the relatively stationary spring contact members 28 to make and break the ignition circuit and produce the spark within the engine cylinders in the customary manner.

Should the stationary contact members become worn after long use and it becomes necessary to replace them, this may be readily accomplished by swinging the spring member 14 about its pivot and removing the cover 9, whereupon the inner spring member of the contact 28 may be compressed to remove it from the openings 25 and both members then moved outwardly to disengage the same from the member 23 whereupon the entire member may be readily removed and a new one substituted therefor.

It is obvious that those skilled in the art may vary the details of construction as well as the arrangement of parts without departing from the spirit of the invention, and therefore it is not wished to be limited to the above disclosure except as may be required by the claims.

What is claimed is:

1. A timer comprising the combination with a rotatable brush, of a contact including a pair of mutually concentric electrically conductive members supported with their common axis substantially tangential to the path of movement of said brush, the intermediate portion of said members being laterally yieldable from such path of movement and being positioned to be contacted by said brush in its rotation.

2. A timer including a relatively fixed contact comprising a support having spaced arms and a pair of concentric helical springs extending between said arms.

3. In a device of the character described, the combination with a rotary brush, of a support extending towards the path of movement of said brush, and an electrically conductive member rotatably mounted on said support on an axis substantially tangential to the path of movement of said brush and with its intermediate portion in the path of movement of said brush and formed to provide a helically extending rib whereby to be rotated by the contact of said brush therewith.

4. In a device of the character described, the combination with a rotary brush, of a pair of spaced supports extending toward the path of movement of said brush, an electrically conductive member rotatably confined between said supports with its intermediate portion in the path of movement of said brush and formed to provide a helically extending rib whereby to be rotated by the contact of said brush therewith, and means for supporting said member, said means comprising a flexible element of circular cross section extending between said supports and having said member loosely mounted for rotation thereon.

5. In a device of the character described, the combination with a rotary brush, of a pair of supports projecting toward the path of rotation of said brush and provided with recesses, a helical spring having its ends confined within said recesses, and an electrically conductive helical spring externally concentric with said first mentioned spring and abutting said supports about said recesses, said first mentioned spring having portions disposed in the path of rotation of said brush whereby to be contacted thereby.

6. A movable contact supporting member for timers comprising a pair of spaced plates one of which is provided with portions engaging the timer casing to prevent axial movement of the same; and a split sleeve, adapted to surround and be secured to the timer shaft, for holding said plates in spaced relation.

7. A stationary contact member for timers comprising a substantially U-shaped member, portions of the legs of which are provided with openings and other portions to act as stops; and readily removable resilient contacts having end portions adapted to enter said openings and engage said stop portions.

8. A stationary contact member for timers comprising a substantially U-shaped member having composite leg portions, the inner parts of the composite portions having openings and the outer parts being in alinement with said openings to act as stops, an inner coiled spring extending through the openings and engaging the stop parts, and an outer coiled spring loosely surrounding the inner coiled spring and interposed between the end portions provided with the openings.

9. A timer brush comprising a pair of semi-sleeve elements each having diametrically opposite mutually complementary flanges, lugs projecting axially from said flanges, and end plates abutting said semi-sleeve elements and provided with apertures adapted to receive adjacent lugs on the flanges of both of said elements, said lugs extended through the apertures of said plates and up-set whereby to secure said plates and said semi-sleeve elements operatively together.

10. A timer brush comprising a pair of semi-sleeve elements adapted to embrace a timer shaft, complementary lugs extending axially from correspondingly spaced points on each of said elements, and end plates each provided with single apertures adapted to receive one lug from each sleeve element, adjacent lugs projecting from said sleeve elements being extended through said apertures in pairs and up-set whereby to secure said sleeve elements together and to secure said plates to said sleeve elements, together with a roller operatively supported from said plates and journaled therebetween.

In testimony whereof, I affix my signature.

EMIL SINNER.